United States Patent
Ong et al.

(10) Patent No.: US 7,098,569 B2
(45) Date of Patent: Aug. 29, 2006

(54) ROTOR ASSEMBLY FOR A PERMANENT MAGNET POWER ELECTRIC MACHINE

(75) Inventors: Raymond Ong, Novi, MI (US); Timothy J. Allen, Fareham (GB); Roy I. Davis, Saline, MI (US); Tod R. Tesch, Novi, MI (US)

(73) Assignee: Ballard Power Systems Corporation, Dearborn, MI (US)

( * ) Notice: Subject to any disclaimer, the term of this patent is extended or adjusted under 35 U.S.C. 154(b) by 0 days.

(21) Appl. No.: 10/927,544

(22) Filed: Aug. 26, 2004

(65) Prior Publication Data
US 2006/0043811 A1    Mar. 2, 2006

Related U.S. Application Data

(60) Provisional application No. 60/608,930, filed on Jul. 30, 2004.

(51) Int. Cl.
*H02K 1/22* (2006.01)
(52) U.S. Cl. ................................. 310/261; 310/262
(58) Field of Classification Search .......... 310/271, 310/261, 262
See application file for complete search history.

(56) References Cited

U.S. PATENT DOCUMENTS

| | | | | |
|---|---|---|---|---|
| 3,454,857 A | 7/1969 | Farrand et al. | ............. | 318/166 |
| 3,852,627 A | 12/1974 | Davis | ............. | 310/13 |
| 4,276,490 A | 6/1981 | Saldinger | ............. | 310/184 |
| 4,795,936 A * | 1/1989 | Crosetto et al. | ............. | 310/156.53 |
| 5,171,138 A | 12/1992 | Forrest | ............. | 418/48 |
| 5,767,607 A | 6/1998 | Kieffer | ............. | 310/261 |
| 6,002,190 A | 12/1999 | Kieffer | ............. | 310/216 |
| 6,150,747 A | 11/2000 | Smith et al. | ............. | 310/258 |
| 6,188,153 B1 | 2/2001 | Hokanson | ............. | 310/52 |
| 6,359,355 B1 | 3/2002 | Hartsfield et al. | ............. | 310/89 |
| 6,584,813 B1 | 7/2003 | Peachee et al. | ............. | 68/23.6 |

(Continued)

FOREIGN PATENT DOCUMENTS

EP    1 235 325 A1    8/2002

(Continued)

OTHER PUBLICATIONS

Dong, S., et al., "A 'Center-Wobbling' Ultrasonic Rotary Motor Using A Metal Tube-Piezoelectric Plate Composite Stator," *Journal of Intelligent Material Systems and Structures* 13:749-755, Nov. 2002.

(Continued)

*Primary Examiner*—Darren Schuberg
*Assistant Examiner*—Nguyen N. Hanh
(74) *Attorney, Agent, or Firm*—Seed IP Law Group PLLC

(57) ABSTRACT

A rotor assembly for use in an electric motor or generator where the mass of the rotor assembly is reduced with respect to conventional rotor assemblies. In addition, the rotor assembly is configured to be scalable to different sized electric motors. Within the rotor assembly, the rotor hub, the shaft, and the permanent magnets can independently or collectively be modified to have a reduced mass. In one aspect, a portion of the rotor hub adjacent to the shaft is configured with passages and spokes. In another aspect, an intermediate hub with lightening holes is provided between the shaft and the rotor hub. In yet another aspect, a large diameter hollow shaft replaces a portion of the rotor hub. In yet another aspect, the permanent magnets are configured to have an arc-shape, which permits the thickness of the magnets to be reduced without reducing the efficiency of the magnets.

17 Claims, 11 Drawing Sheets

U.S. PATENT DOCUMENTS

| | | | |
|---|---|---|---|
| 6,619,935 B1 | 9/2003 | Kluth et al. | 417/423.1 |
| 6,700,284 B1 | 3/2004 | Williams et al. | 310/216 |
| 6,873,085 B1 * | 3/2005 | Graham et al. | 310/266 |
| 2002/0113518 A1 | 8/2002 | Hsu | 310/254 |
| 2002/0134118 A1 | 9/2002 | Peechee et al. | 68/23 R |
| 2002/0135255 A1 | 9/2002 | Williams et al. | 310/166 |
| 2002/0139606 A1 | 10/2002 | Williams et al. | 180/446 |
| 2002/0145348 A1 | 10/2002 | Anma | 310/91 |
| 2003/0048024 A1 | 3/2003 | Chu | 310/216 |
| 2005/0140235 A1 | 6/2005 | Yamagishi et al. | 310/156.53 |

FOREIGN PATENT DOCUMENTS

| | | |
|---|---|---|
| EP | 1 050 946 A3 | 10/2002 |
| JP | 63161854 * | 6/1988 |
| JP | 11206051 * | 6/1999 |
| WO | WO 01/44615 A3 | 6/2001 |
| WO | WO 02/077352 A3 | 10/2002 |
| WO | WO 02/078149 A1 | 10/2002 |
| WO | WO 02/082621 A1 | 10/2002 |

OTHER PUBLICATIONS

Fechine, E., et al., "Step by Step Feeding of a New Hybrid Motor with Segmented Stator Magnet," in *Proceedings of the 3rd International MOTORCON Conference*, 1982, pp. 99-110.

Jack, A., et al., "Design and Testing of a Universal Motor Using a Soft Magnetic Composite Stator," in *Proceedings of the 35th IAS Annual Meeting and World Conference on Industrial Applications of Electrical Energy*, 2000, vol. 1, pp. 46-50.

U.S. Appl. No. 60/432,468, filed Dec. 10, 2002, Allen et al.
U.S. Appl. No. 60/432,727, filed Dec. 11, 2002, Mellor et al.
U.S. Appl. No. 10/728,715, filed Dec. 4, 2003, Allen et al.
U.S. Appl. No. 10/730,759, filed Dec. 8, 2003, Mellor et al.

* cited by examiner

ROTOR ASSEMBLY FOR A PERMANENT MAGNET POWER ELECTRIC MACHINE

This application claims the benefit of U.S. Provisional Patent Application No. 60/608,930 filed on Jul. 30, 2004, which is incorporated herein by reference in its entirety.

BACKGROUND OF THE INVENTION

1. Technical Field

The present disclosure relates generally to electric machines, for example, permanent magnet motors and generators.

2. Description of the Related Art

Electric machines, such as electric motors and generators, are used in many applications, including those ranging from electric vehicles to domestic appliances. Improvements in machine performance, reliability, efficiency, and power density for all types of electric motors are desirable.

An electric machine converts electrical or electromagnetic energy into mechanical energy or conversely converts mechanical energy into electrical or electromagnetic energy.

The permanent magnets used in rotor assemblies are disposed within axially extending pockets. The pockets are typically formed near the outer perimeter of the rotor hub, which is built up from laminations made from electric grade steel. Electric grade steel is used on rotor assemblies because it has a greater permeability for conducting the magnetic lines of force. The process of building up a rotor with laminations is done to reduce eddy current losses in the rotor hub, especially during higher rotation speeds. The rotor extends from its outer perimeter to an inner diameter that interfaces with a shaft. The total mass of the rotor assembly is one of the parameters that affects the acceleration characteristics of the electric motor, the cost of the rotor assembly, and the amount of stress experienced by the various components of the rotor assembly, among other things.

Shafts used in electric machine are typically made from structural steel, which is slightly more dense and certainly stronger than electric grade steel. In one application, an electric motor of the Toyota Prius, which is a hybrid vehicle, utilizes a hollow shaft with an integrated carriage. The carriage includes a central web having one end connected to the main shaft and the other end connected to a carriage support that extends axially in either direction away from the central web. A laminated rotor hub with permanent magnets is retained within the carriage support. The inclusion of the central web extending radially from the shaft creates unique balancing issues with respect to vibration modes. The bearing positions on the shaft of the Toyota Prius shaft must be positioned to minimize the bending stress arising from the central web. Thus, although the Toyota Prius shaft provides dome marginal weight reduction benefits, the configuration of the rotor assembly is not readily convertible to other types or sizes of motors.

Conventional rotor assemblies include rectangular-shaped rotor pockets in which the rectangular-shaped permanent magnets are disposed. In these conventional rotor assemblies, the stress concentrations in the magnet pockets and in the rotor laminations exacerbate the localized stresses as the operating speeds increase. When the rotor rotates at high speeds, the permanent magnets exert an outward radial force on the magnet pockets, which results in the centrifugal forces being reacted at the outer corners of the pockets. These localized stresses in conventional rotor assemblies are one reason for providing more material in the rotor.

It would be desirable to reduce the mass of the rotor hub, the shaft, and the permanent magnets either individually or collectively while maintaining a rotor assembly configuration that could be easily manufactured and scaled to different size electric machines.

BRIEF SUMMARY OF THE INVENTION

The assemblies and components described herein provide a variety of ways to reduce the weight of a rotor assembly for an electric machine. Reducing the weight of the rotor assembly permits the rotor to rotate at higher speeds while meeting specific mass targets for electric machines in the automotive industry.

In one embodiment, a rotor assembly includes a rotor hub comprising a first portion and a second portion, the first portion comprising an outer diameter and an inner diameter, the first portion comprising a plurality of uniformly, circumferentially spaced magnet pockets, the second portion comprising an inner diameter and an outer diameter, the outer diameter of the second portion abutting with the inner diameter of the first portion, the second portion comprising a plurality of passages, each adjacent passage separated by spokes, each spoke comprising a uniform thickness with respect to an adjacent spoke, the spokes connecting the outer diameter of the second portion with a shaft attachment region, the region integrally and proximately formed with the inner diameter of the second portion; a first set of permanent magnets, a respective one of the permanent magnets of the first set of permanent magnets received in a respective one of the magnet pockets; and a shaft comprising an outer diameter sized to closely receive the inner diameter of the second portion of the rotor hub.

In another embodiment, an electric machine includes a rotor assembly comprising a rotor hub and a shaft, the rotor hub comprising a first portion and a second portion, the first portion comprising an outer diameter and an inner diameter, the first portion comprising a plurality of uniformly, circumferentially spaced magnet pockets, the second portion comprising an inner diameter and an outer diameter, the outer diameter of the second portion abutting with the inner diameter of the first portion, the second portion comprising a plurality of passages, each adjacent passage separated by spokes, each spoke comprising a uniform thickness with respect to an adjacent spoke, the spokes connecting the outer diameter of the second portion with a shaft attachment region, the region integrally and proximately formed with the inner diameter of the second portion; a first set of permanent magnets, a respective one of the permanent magnets of the first set of permanent magnets received in a respective one of the magnet pockets; and a stator comprising a plurality of windings, the windings positioned to electromagnetically cause rotation of the rotor assembly.

In another embodiment, a rotor assembly includes a rotor hub comprising an outer diameter and an inner diameter, a plurality of uniformly, circumferentially spaced magnet pockets located between the outer diameter and the inner diameter; a first set of permanent magnets, a respective one of the permanent magnets of the first set of permanent magnets received in a respective one of the magnet pockets; an intermediate hub comprising an outer diameter and an inner diameter, the intermediate hub further comprising a plurality of lightening holes axisymmetrically arranged between a region bordered by the outer diameter and the inner diameter of the intermediate hub, the outer diameter of the intermediate hub being sized to closely receive the inner diameter of the rotor hub; and a shaft comprising an outer diameter sized to closely receive the inner diameter of the intermediate hub.

In another embodiment, an electric machine includes a rotor assembly comprising a rotor hub, a shaft, and an intermediate hub, the rotor hub comprising an outer diameter and an inner diameter, a plurality of uniformly, circumferentially spaced magnet pockets located between the outer diameter and the inner diameter; a first set of permanent magnets, a respective one of the permanent magnets of the first set of permanent magnets received in a respective one of the magnet pockets; an intermediate hub comprising an outer diameter and an inner diameter, the intermediate hub further comprising a plurality of lightening holes axisymmetrically arranged between a region bordered by the outer diameter and the inner diameter of the intermediate hub, the outer diameter of the intermediate hub being sized to closely receive the inner diameter of the rotor hub; and a stator comprising a plurality of windings, the windings positioned to electromagnetically cause rotation of the rotor assembly.

In yet another embodiment, a rotor hub includes an outer diameter and an inner diameter; a plurality of magnet pockets, the pockets formed in a region proximate to and slightly radially inward from the outer diameter of the rotor hub; and at least a first permanent magnet comprising a pole arc to pole pitch ratio of about 0.9 arranged within each magnet pocket.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the devices and/or processes described herein, as defined solely by the claims, will become apparent in the non-limiting detailed description set forth herein.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE INVENTION

In the following description, certain specific details are set forth in order to provide a thorough understanding of various embodiments of the present assemblies, devices and systems. However, one skilled in the relevant art will recognize that the present assemblies, devices and systems may be practiced without one or more of these specific details, or with other methods, components, materials, etc. In other instances, well-known structures associated with electric machines have not been shown or described in detail to avoid unnecessarily obscuring descriptions of the embodiments of the present assemblies, devices and systems.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment of the present assemblies, devices and systems. Thus, the appearances of the phrases "in one embodiment" or "in an embodiment" in various places throughout this specification are not necessarily all referring to the same embodiment. Further more, the particular features, structures, or characteristics may be combined in any suitable manner in one or more embodiments.

The headings provided herein are for convenience only and do not interpret the scope or meaning of the claimed invention.

Rotor Assembly

Figure 1:
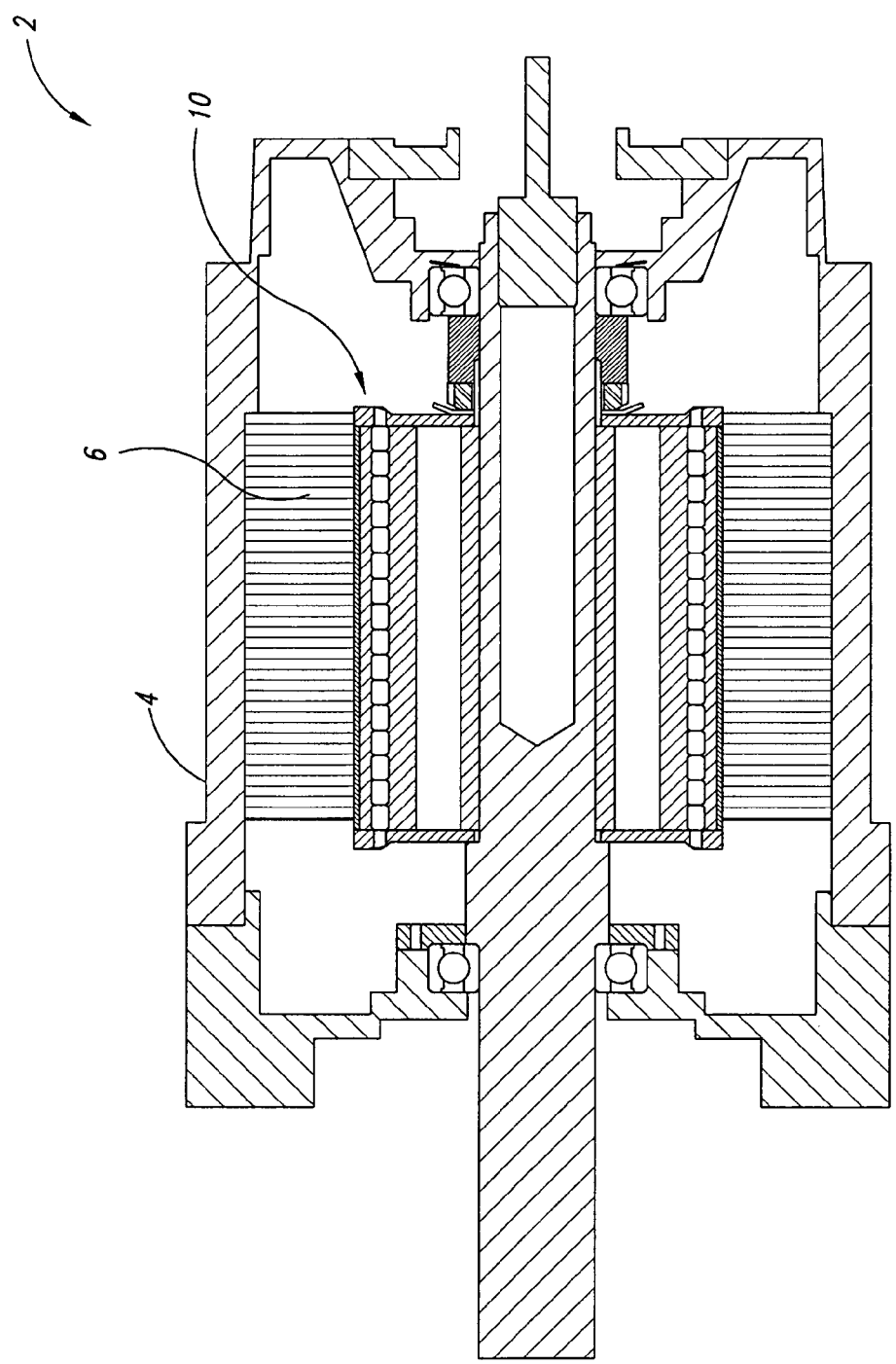
FIG. 1 is a cross-sectional view of an electric machine according to one illustrated embodiment.

FIG. 1 illustrates an electric machine 2 according to one embodiment of the present assemblies, devices and systems. The electric machine 2 of the illustrated embodiment comprises a housing 4, a stator 6, and a rotor assembly 10. The stator 6 includes electrical windings, which are not shown, but are well known in the art.

Figure 2:
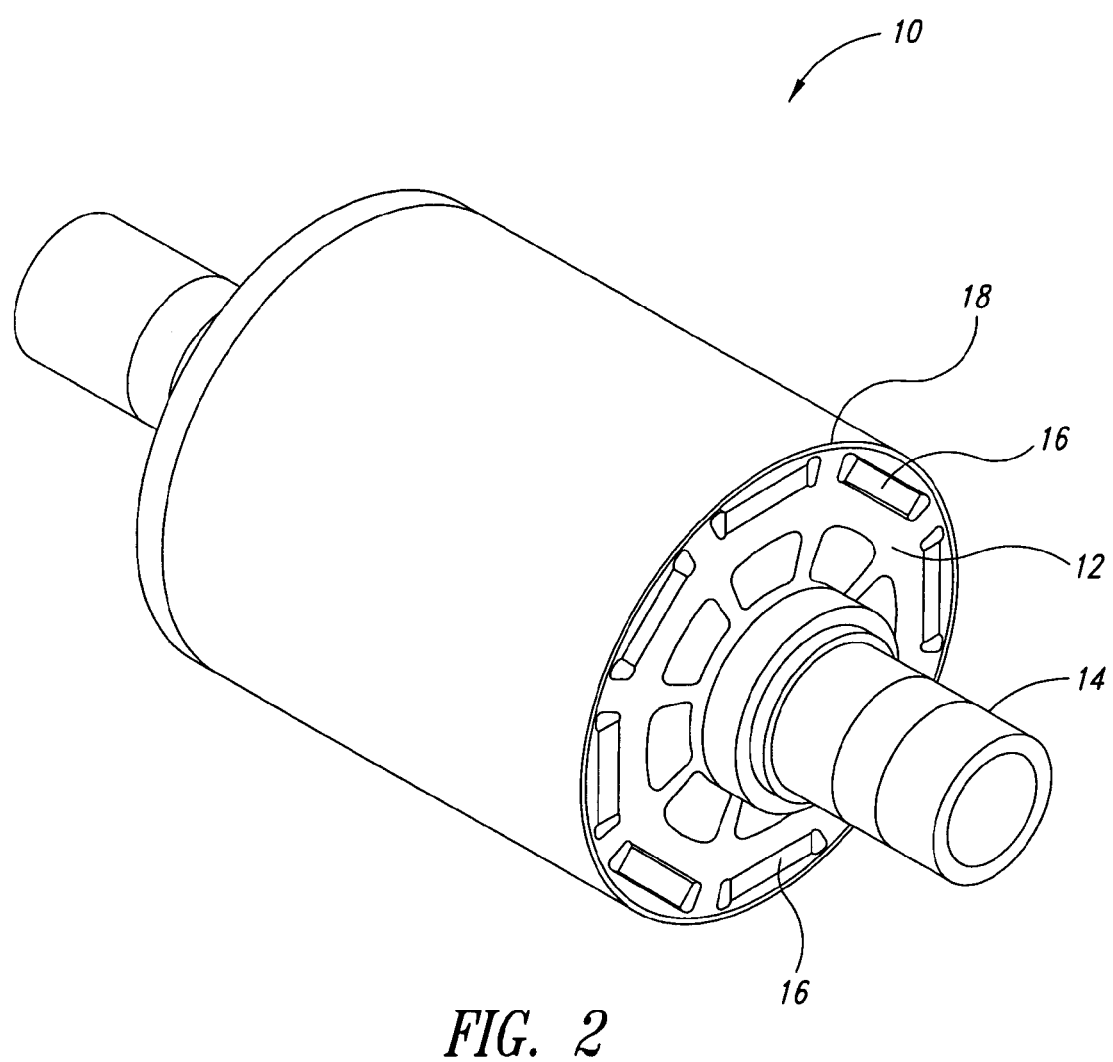
FIG. 2 is a front, left isometric view of a rotor assembly for an electric motor according to one illustrated embodiment.
Figure 3:
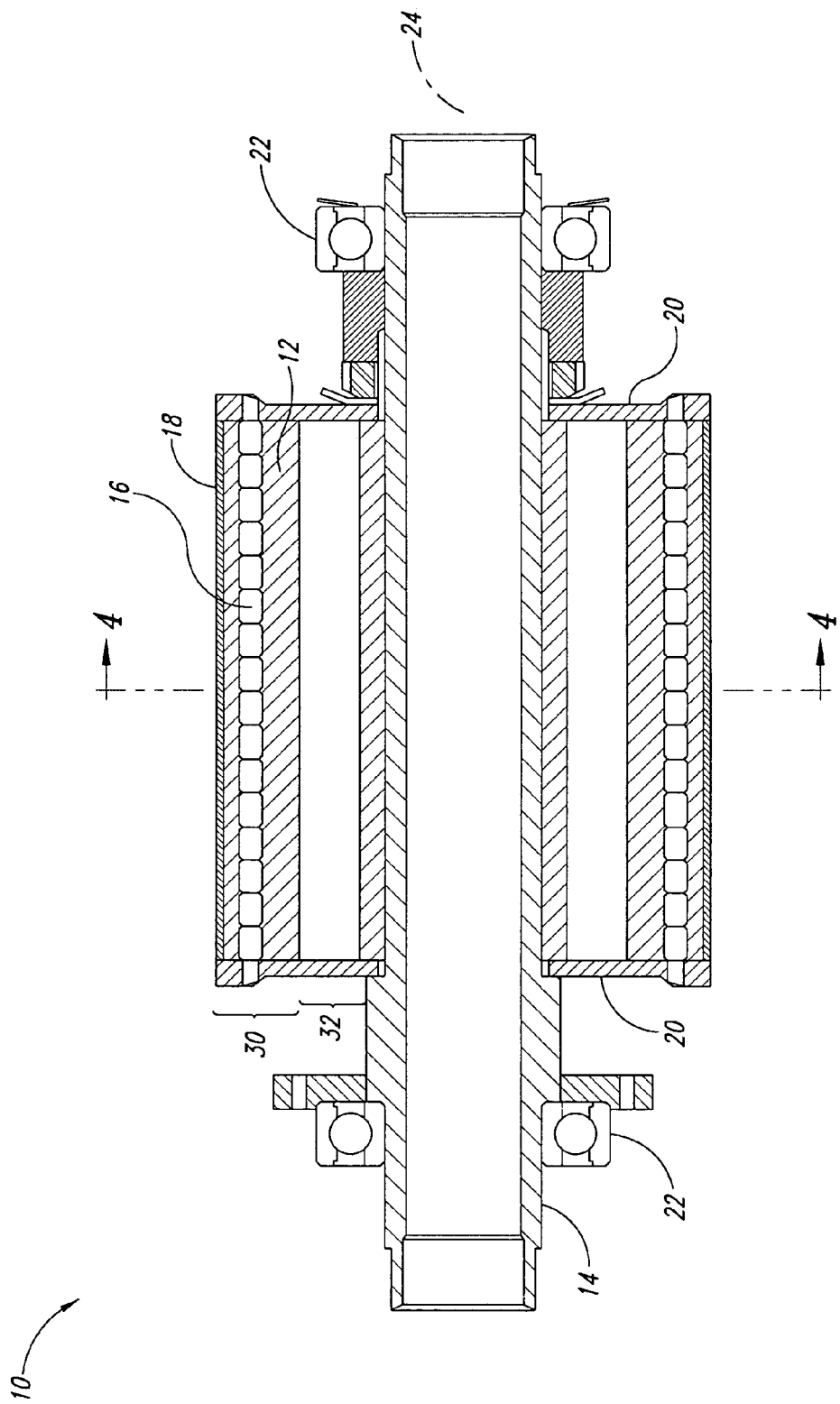
FIG. 3 is a cross-sectional view of the rotor assembly of FIG. 2.

FIGS. 2 and 3 show the rotor assembly 10 comprising a rotor hub 12, a shaft 14, a number of permanent magnets 16, and a banding layer 18. The rotor assembly 10 further comprises a pair of end plates 20. The shaft 14 is mounted on roller bearings 22. The rotor assembly 10 is mass balanced to rotate about a centerline 24. The mass balancing can be accomplished by removing or adding material to the end plates 20.

The rotor hub 12 includes a first portion 30 and a second portion 32. The rotor hub 12 is built up from laminations, which is a process well known in the art to reduce the eddy current effect in the rotor hub 12. The laminations are thin steel layers or sheets, which are stacked and fastened together by cleats, rivets or welds. The first portion 30 of the rotor hub 12, often referred to as the "active" portion of the rotor hub 12, conducts the lines of magnetic flux. Thus, the dimensions of a cross-sectional area of the first portion 30 affect the efficiency of the device. As the cross-sectional area of the first portion 30 decreases, the reluctance (e.g., resistance) increases. Accordingly, one way to reduce the weight of the rotor assembly 10 is to reduce the cross sectional area of the second portion 32 of the rotor hub 12.

The first portion 30 and the second portion 32 can be integrally formed to achieve a monolithic or one-piece rotor hub 12. However, one skilled in the art will understand and appreciate that the first portion 30 and the second portion 32 can also be separate components that are mechanically joined, for example by an interference fit-up process.

Figure 4:
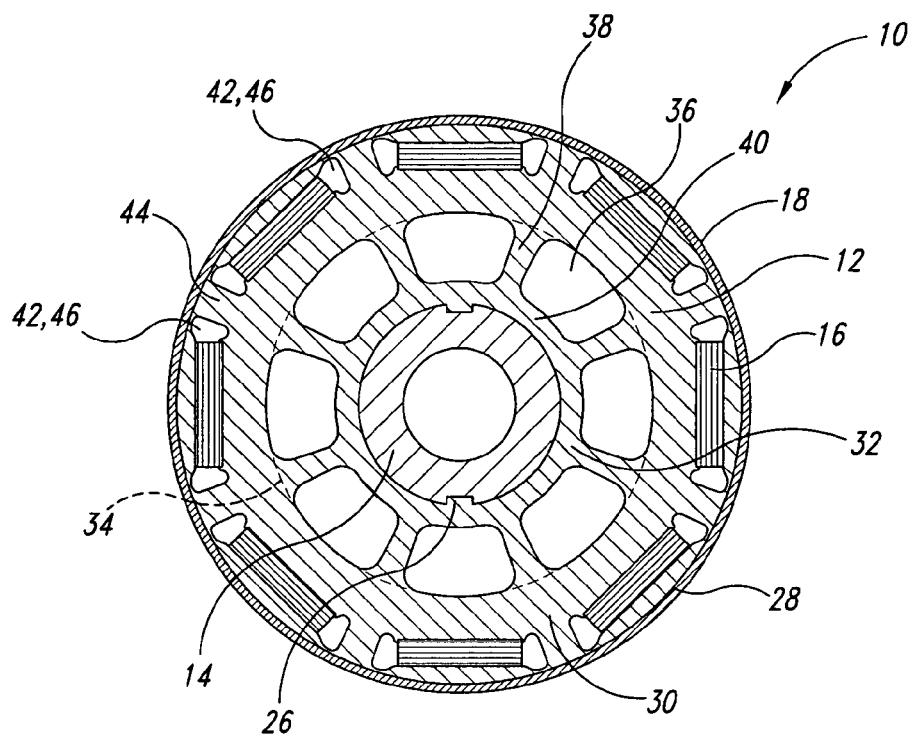
FIG. 4 is a cross-sectional view of the rotor assembly of FIG. 2 along line 4—4 of FIG. 3 showing the rotor hub configured with circumferentially spaced passages and spokes.

FIG. 4 shows the rotor assembly 10 of FIG. 2. A dashed line 34 represents the demarcation between the first portion 30 and the second portion 32 of the rotor hub 12. The shaft 14 is torsionally coupled with the second portion 32 of rotor hub 12 by complementary formed keyways 26. The torsional coupling strength between the shaft 14 and the rotor hub 12 can be increased by providing an interference fit between the shaft 14 and the rotor hub 12. The interference fit can be in addition to the keyways 26 or it can be the sole means of torsionally coupling the shaft 14 to the rotor hub 12. In the illustrated embodiment, only two keyways 26 are shown, however one skilled in the art will understand and appreciate that the rotor assembly 10 may employ a greater or a lesser number of keyways 26.

In addition to the second portion 32 providing a mechanical interface between the first portion 30 of the rotor hub 12 and the shaft 14, the second portion 32 can further be configured with a reduced-weight cross-sectional profile that is capable of withstanding the operating stresses of the electric machine, for example stresses due to thermal cycling, centrifugal forces, and other forces. In one embodiment, the rotor hub 12 may be operable between speeds of about 13,500–18,000 rpm. In addition, the rotor hub 12 can operate at temperatures up to about 120 degrees Celsius. In an alternate embodiment, the rotor hub 12 can operate at temperatures up to about 180 degrees Celsius.

The lamination sheets that are used to build up the rotor hub 12 are typically made from an electrical steel, which has a lower strength than a structural steel. By way of example, electrical steel, which is sometimes referred to as "lamination steel," can have a tensile strength/density ratio that is about 50% less than the tensile strength/density ratio of structural steel. In the present embodiment, the lamination steel may have a density of 7.6 g/cm$^3$ and a tensile strength of 550 MPa. Structural steel, like that used for the shaft 14, can have a density of 7.9 g/cm$^3$ and a tensile strength of 850 MPa.

Because weaker lamination steel is typically used for building up rotor hubs, it has been common in the industry to have both the first portion 30 and the second portion 32 be solid. As explained, earlier, the first portion 30 needs to be substantially solid to efficiently conduct sufficient lines of magnetic flux. However, a solid second portion 32 adds a significant amount of material and attributes excess weight to the rotor hub 12.

Still referring to FIG. 4, the illustrated embodiment depicts the second portion 32 of the rotor hub 12 configured with a number of circumferentially spaced passages 36 separated by spokes 38. The passages 36 and spokes 38 are adjacently located and connected to a shaft attachment region 40. The shaft attachment region 40 provides sufficient material to form the keyways 26 and withstand the torsional stresses resulting from the interaction between the shaft 14 and the rotor hub 12. The passages 36 extend axially through the second portion 32 of the rotor hub 12 as shown in FIG. 3. Although eight passages 36 are shown in the illustrated embodiment, one skilled in the art will understand and appreciate that second portion 32 can be configured with a greater or lesser number of passages 36.

Now referring back to the first portion 30 of the rotor hub 12, the illustrated embodiment includes eight magnet pockets 42, each pocket configured to receive sixteen permanent magnets 16. The permanent magnets 16 can be made from sintered neodymium iron boron, which is suitable for operation up to a temperature of at least 180 degrees Celsius. One skilled in the art will understand and appreciate that the first portion 30 of the rotor hub 12 can include a greater or a lesser number of permanent magnets 16.

Further shown in the illustrated embodiment is the banding layer 18, which is formed around an outer diameter 28 of the first portion 30 of the rotor hub 12. A plurality of ribs 44 separate the circumferentially spaced magnet pockets 42. An epoxy is used to fill the space 46 remaining in the magnet pockets 46 that is not otherwise filled by the permanent magnets 16. One epoxy that can be used to fill the remaining space 46 is a glass filled epoxy. The permanent magnets 16 can additionally or alternatively be bonded within the magnet pockets 42 with a magnetic adhesive such as a cyanoacrylate adhesive. In the illustrated embodiment, the permanent magnets 16 are provided with straight sides and a thickness of about 9.0 mm.

One advantage of forming the banding layer 18 around the rotor hub 12 is that the banding layer 18 provides radial reinforcement for the rotor hub 12 and the permanent magnets 16. In addition, the banding layer 18 can protect the permanent magnets 16 against corrosion. The banding layer 18 is composed of a carbon/epoxy matrix. In one embodiment, the banding layer 18 is composed of a 65% carbon/epoxy matrix. The carbon/epoxy composite material is wet laid onto the rotor hub 12 where a bond is formed between an inner diameter of the banding layer 18 and the outer diameter 28 of the rotor hub 12. A banding layer thickness in the range of about 1.00 mm to 2.00 mm is adequate for most electric machine applications.

Figure 5A:
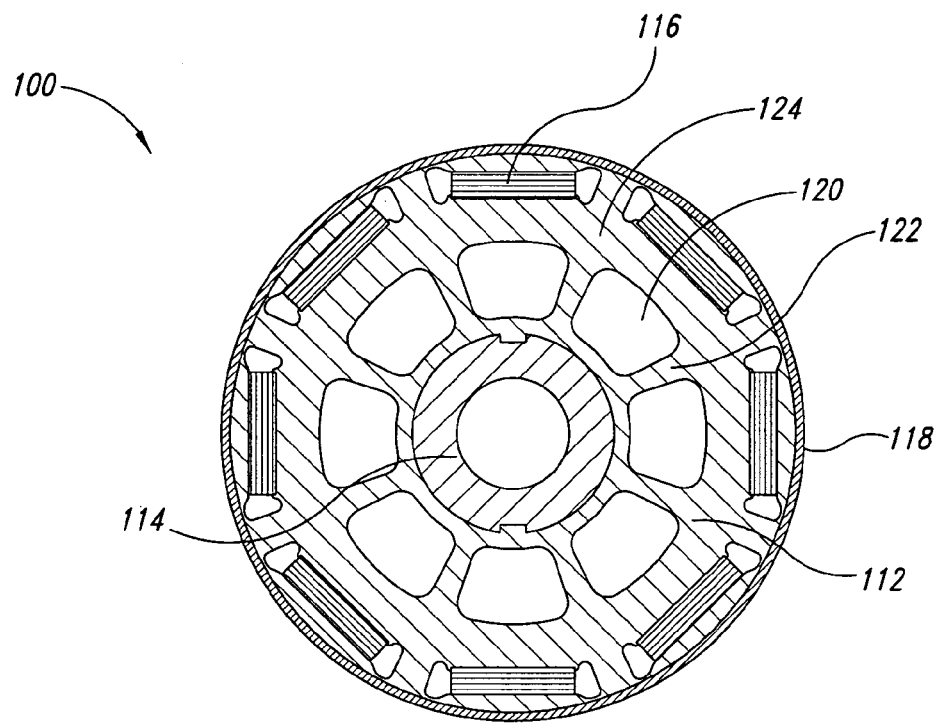
FIG. 5A is a cross-sectional view of another rotor assembly having reduced thickness spokes according to another illustrated embodiment.
Figure 5B:
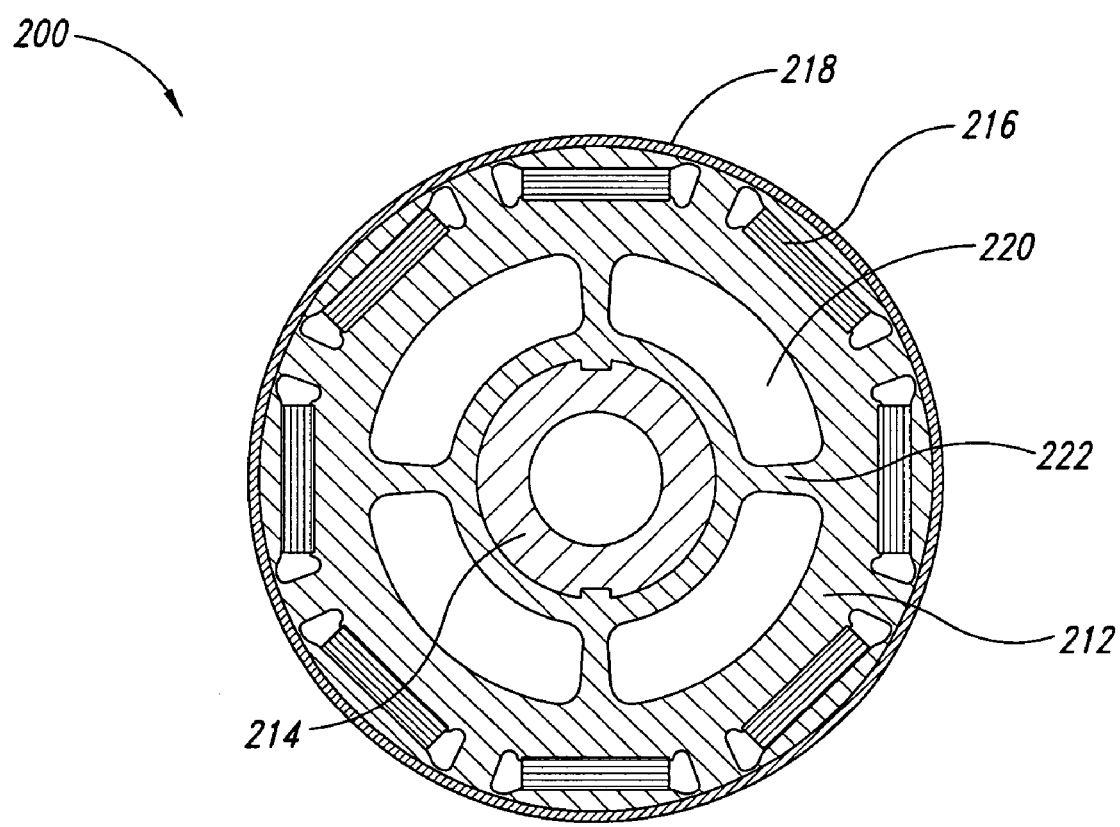
FIG. 5B is a cross-sectional view of another rotor assembly having a reduced number of passages and spokes according to another illustrated embodiment

FIGS. 5A and 5B illustrate two alternative embodiments where each of the alternative embodiments differs from the previous embodiment only by the configuration of the passages 36 and spokes 38. FIG. 5A illustrates one alternate embodiment of a rotor assembly 100. The rotor assembly 100 has a rotor hub 112, a shaft 114, permanent magnets 116, and a banding layer 118. The passages 120 are widened, or stating this alternatively, the thickness of each spoke 122 is reduced. Such a reduction can be verified through the use of finite element analysis or prototype testing to insure that the spokes 122 retain enough cross-sectional area to support the first portion 124 of the rotor hub 112. Now referring to FIG. 5B, the rotor assembly 200 is similar to the previous embodiment in that it has a rotor hub 212, a shaft 214, magnets 216, and a banding layer 218. The rotor hub 212 is configured with a fewer number of passages 220 and likewise a fewer number of spokes 222. In short, the relative weight reduction in a range of about 25%–35% may be achieved with any of the above embodiments. The stated weight reduction is in comparison to a solid rotor hub, specifically a solid second portion of a rotor hub.

Figure 6:
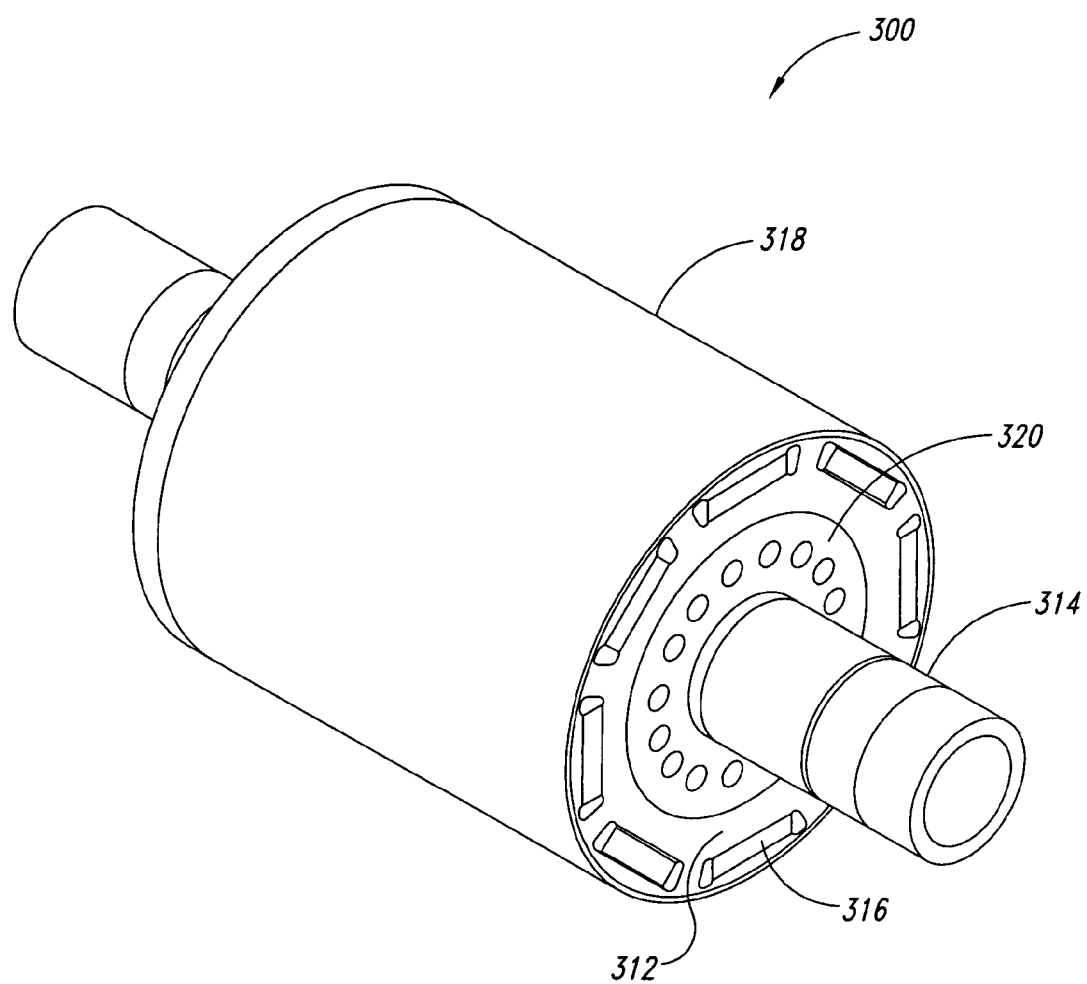
FIG. 6 is a front, left isometric view of a rotor assembly having an intermediate hub according to another illustrated embodiment.
Figure 7:
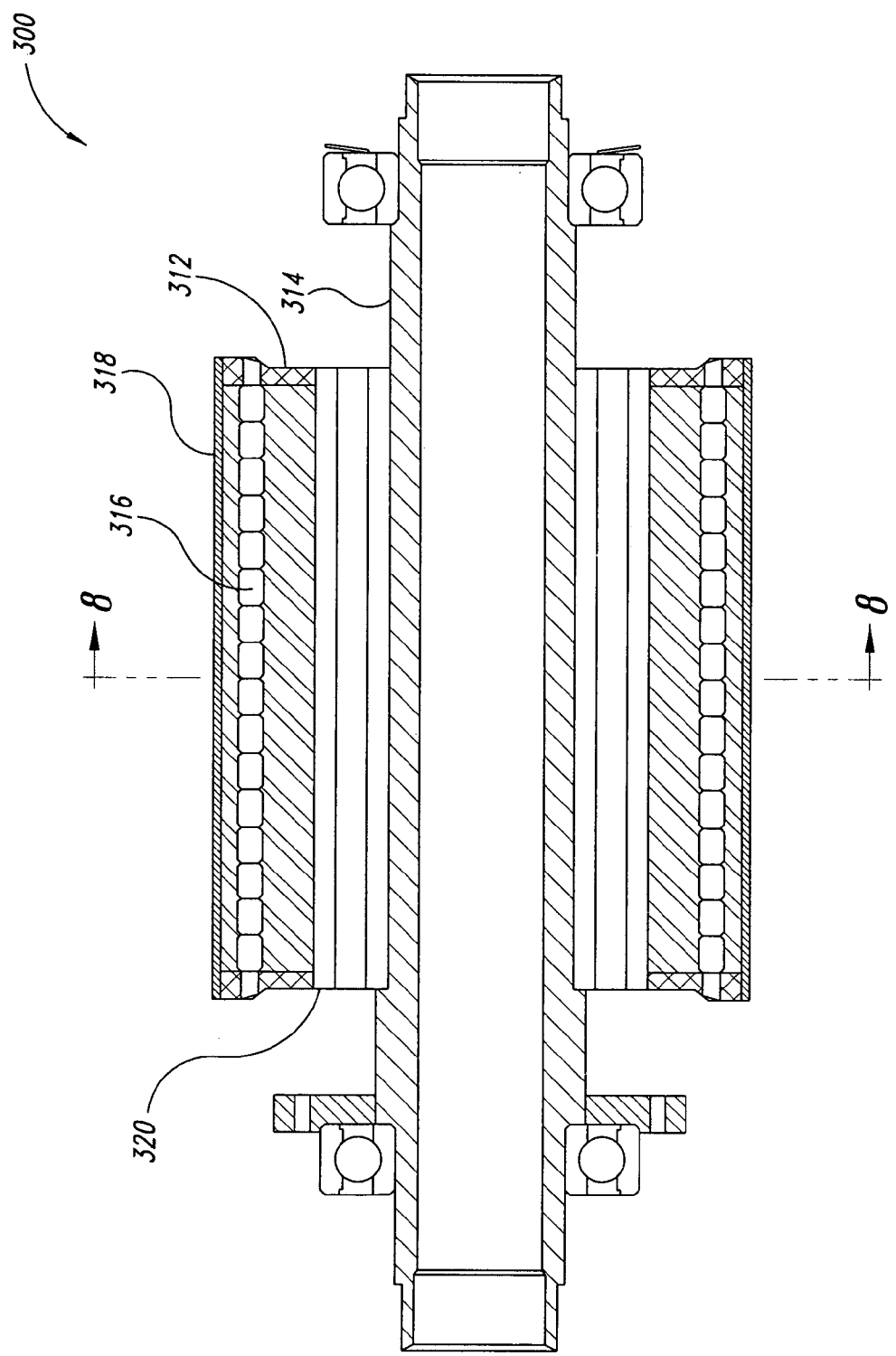
FIG. 7 is a cross-sectional view of the rotor assembly of FIG. 6.
Figure 8A:
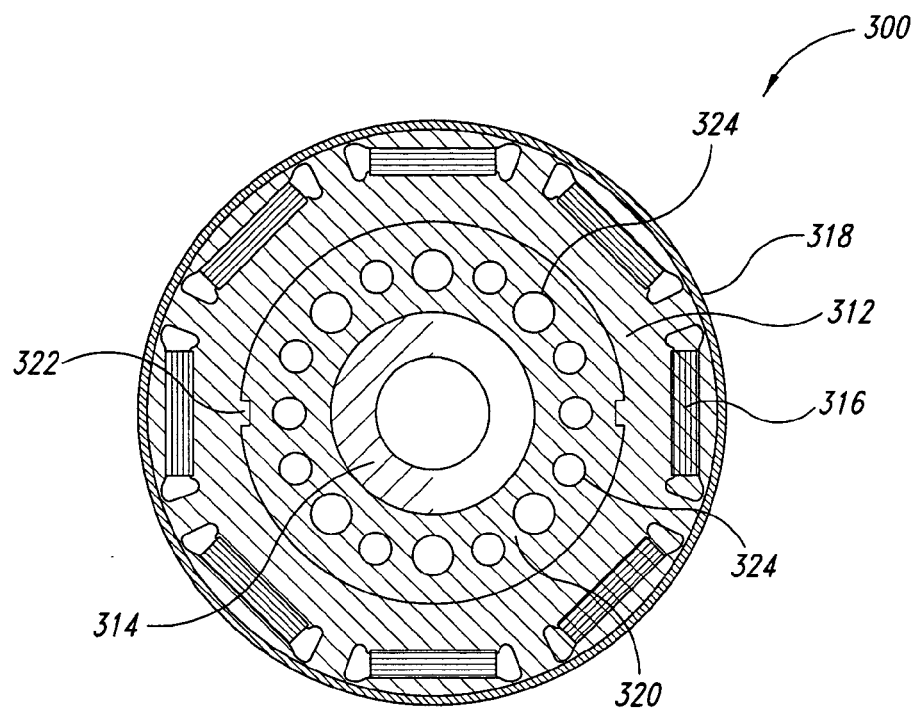
FIG. 8A is a cross-sectional view of the rotor assembly of FIG. 6 along line 8—8 of FIG. 7 showing the rotor hub configured with an intermediate hub that includes lightening holes therein.

FIGS. 6, 7 and 8A illustrate a rotor assembly 300 according to another embodiment of the present assemblies, devices and systems. The rotor assembly 300 is similar to the previous embodiment in that it has a rotor hub 312, a shaft 314, magnets 316, and a banding layer 318. However, the rotor hub 312 differs from that of FIGS. 2 through 5B in that an intermediate hub 320 is substituted for the second portion 32 of the embodiment depicted in e.g. FIG. 3.

FIG. 8A shows the intermediate hub 320 located between the rotor hub 312 and the shaft 314. In addition, the intermediate hub 320 is made from aluminum in the present embodiment. The tensile strength of aluminum in comparison to its low density makes aluminum a good component for the intermediate hub 320. The intermediate hub 320 can be interference fit with the shaft 314. Due to the range of operating temperatures of the rotor assembly 300, the interface pressure developed during the interference fit generation between the intermediate hub 320 and the shaft 314 can be increased. One method of developing a high interference fit between the intermediate hub 320 and the shaft 314 is to heat up the intermediate hub 320, assemble it with the shaft 314, and then allow the assembly to cool.

The intermediate hub 320 also physically interfaces with the rotor hub 312. In the illustrated embodiment, the torsional coupling of the intermediate hub 320 with the rotor hub 312 can be accomplished with keyways 322. Alternatively, the torsional coupling of the intermediate hub 320 with the rotor hub 312 can be mechanically accomplished with an interference fit, bonding, welding, or some other process.

The weight of the intermediate hub 320 can be further reduced by the addition of lightening holes 324, which can extend all the way through the axial length of the intermediate hub 320.

Figure 8B:
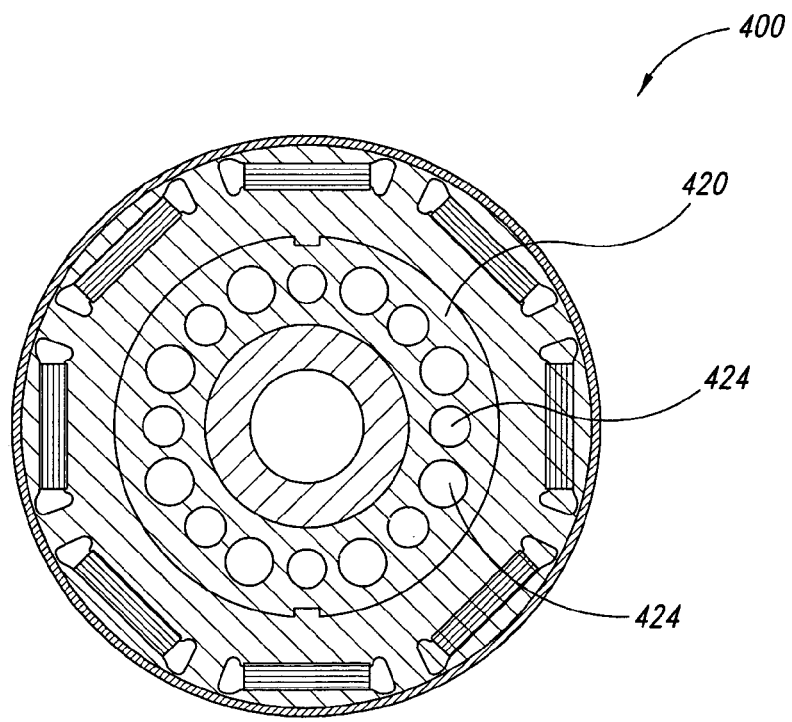
FIG. 8B is a cross-sectional view of another rotor assembly having a different configuration of lightening holes in the intermediate hub.

FIG. 8B illustrates a rotor assembly 400, which is similar to the rotor assembly 300 of FIG. 8A except that an intermediate hub 420 includes a number of larger lightening holes 424. One skilled in the art will understand and appreciate that the size, shape, and orientation of the lightening holes 424 can vary depending on any number of factors. In one embodiment, the lightening holes 424 can be configured to augment the mass balancing of the rotor assembly 400. Consequently, the relative weight reduction of the embodiments shown in FIGS. 6, 7, 8A, and 8B, when compared to a solid rotor hub, specifically a solid second portion of a rotor hub, is in the range of about 15%–25%.

Arc-Shaped Magnets in the Rotor Hub

Figure 9:
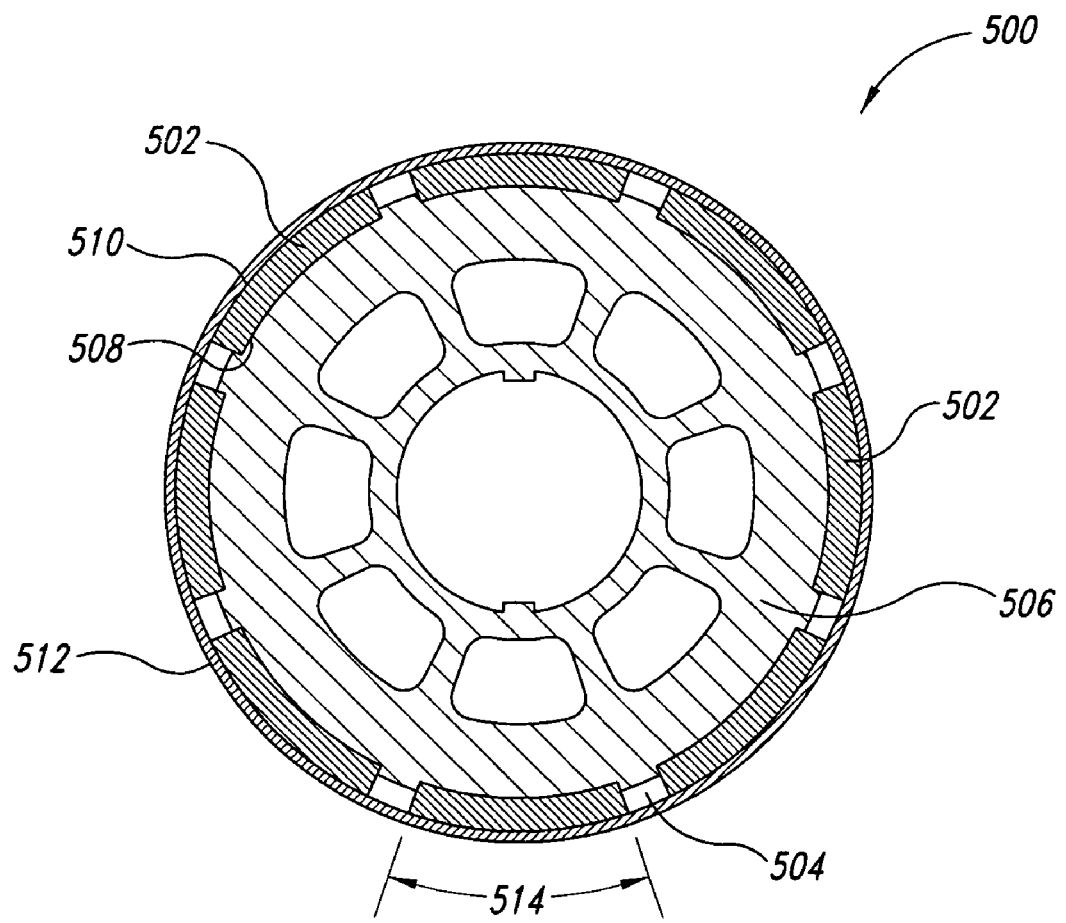
FIG. 9 is a cross-sectional view of a rotor assembly having a shaft torsionally coupled with a full-thickness rotor hub according to one illustrated embodiment.

FIG. 9 illustrates a cross-sectional view of a rotor assembly 500 according to one embodiment of the present assemblies, devices and systems. Only significant differences between the present embodiment and the above embodiments will be identified. In the illustrated embodiment, a number of permanent magnets 502 are arranged around an outer portion 504 of a rotor hub 506. Each of the permanent magnets 502 has an annular shape with an inner arc 508 and an outer arc 510. The permanent magnets 502 can be recessed into the rotor hub 506 and retained with the rotor hub 506 by a banding layer 512. A magnet adhesive (not shown), such as a cyanoacrylate adhesive, can be used to bond the permanent magnets 502 with the rotor hub 506 and/or the banding layer 512.

In the illustrated embodiment, the permanent magnets 502 are configured to have an arc measurement 514. When the arc measurement 514 is in the range of about 35.5–45.5 degrees, the thickness and thus the weight of the permanent magnets 502 can be reduced. In one embodiment, the arc measurement 514 is about 40.5 degrees, which correlates to a pole arc to pole pitch ratio of 0.9. The magnet thickness can be reduced to about 7.5 mm when the arc measurement 514 is about 40.5. Testing has indicated that magnetic loading and electromotive force (EMF) begin to fall off at pole arc to pole pitch ratios below 0.9. In order to counter this phenomenon, additional electrical loading would be required, but in turn, this results in greater copper losses (i.e., $I^2R$ losses).

A Large Diameter, Hollow Shaft in the Rotor Assembly

Figure 10:
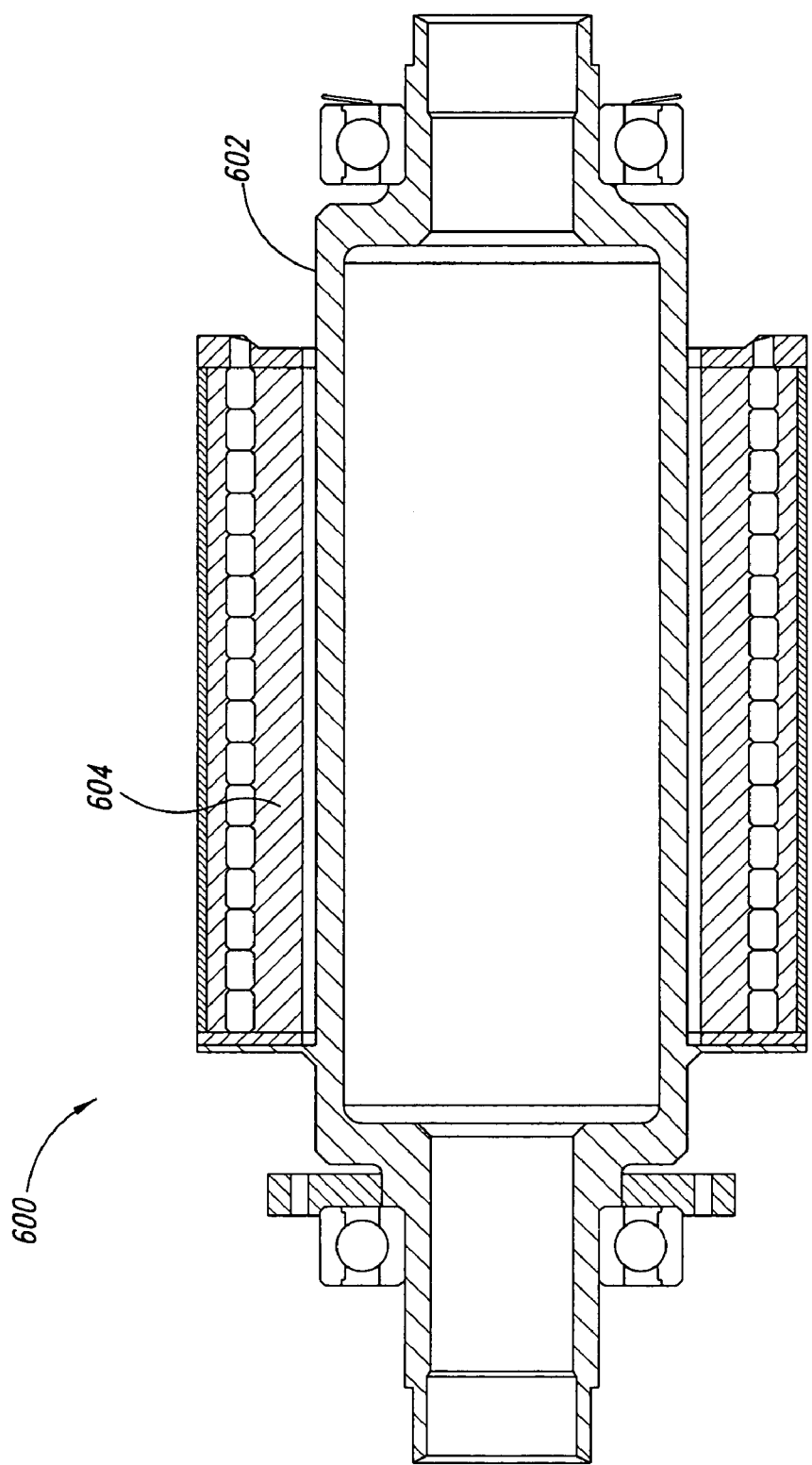
FIG. 10 is a cross-sectional view of a rotor assembly having an enlarged diameter hollow shaft according to one illustrated embodiment.

FIG. 10 illustrates a rotor assembly 600 with a large diameter, hollow shaft 602 rotationally coupled to a rotor hub 604. One purpose of the hollow shaft 602 is to replace the second portion 32 of the rotor hub 12 shown in FIGS. 3 and 4. By providing the hollow shaft 602, the rotor hub 604 could be mounted directly to the hollow shaft 602 whether with complementary keyways, an interference fit, or some other mechanical coupling method.

Figure 11:
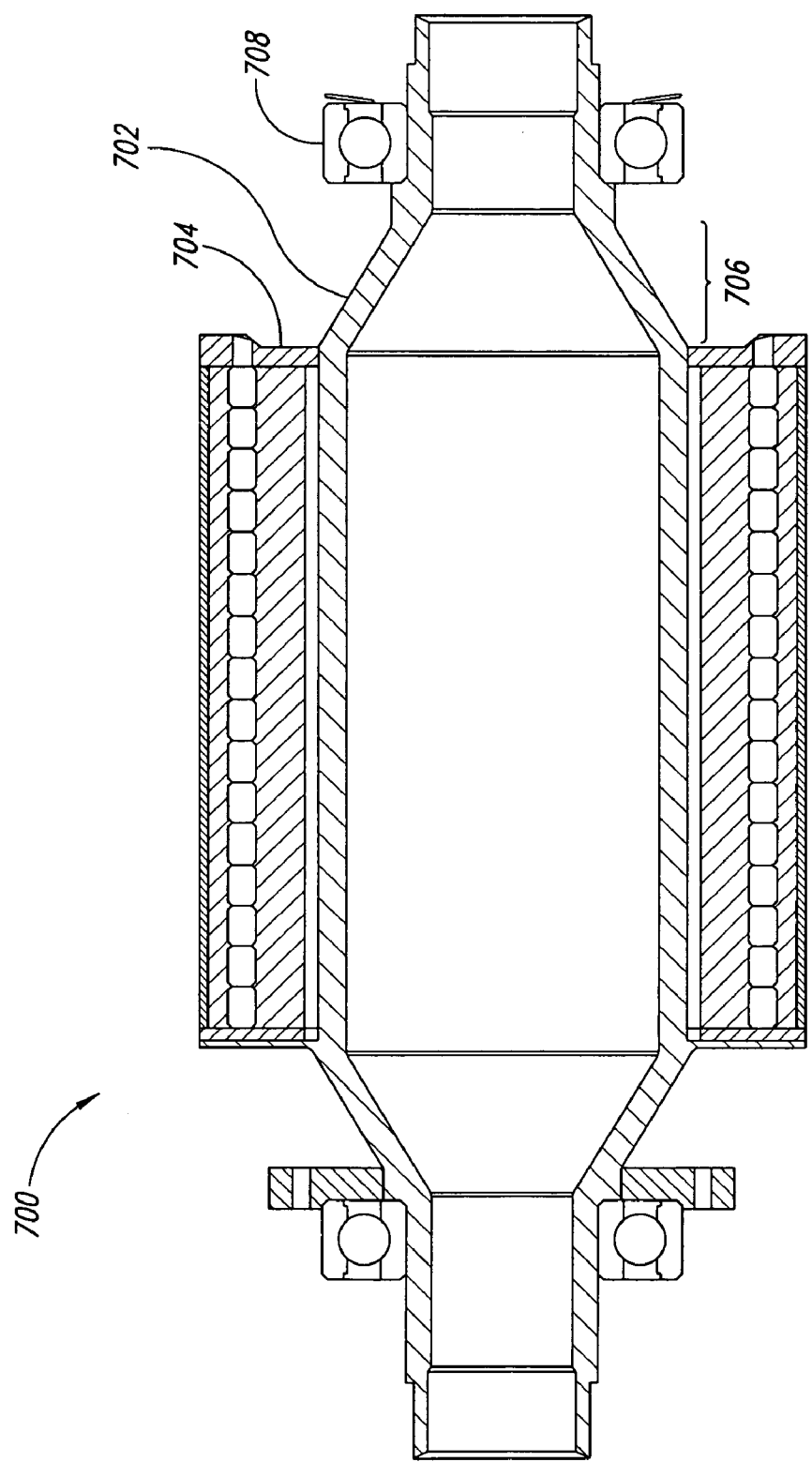
FIG. 11 is a cross-sectional view of another rotor assembly having an enlarged diameter hollow shaft with a generally tapered region between an end plate and bearing according to one illustrated embodiment.

FIG. 11 illustrates another rotor assembly 700 with a large diameter hollow shaft 702. A rotor hub 704 can receive the hollow shaft 702. Unlike the previous embodiment, the hollow shaft 702 of the illustrated embodiment has a blended section 706 that blends into each journal end 708. The blended section 706 can reduce localized stress concentrations and smooth out the load path. The embodiments with the hollow shafts 602, 702 illustrated in FIGS. 10 and 11 would not only reduce the overall weight of the rotor assembly, but also reduce the part count of the rotor assemblies 600, 700.

One advantage of the embodiments of the rotor assemblies discussed herein is that at least a majority of any intricately shaped portions of the rotor assembly are within the laminated region of the rotor assembly. In doing such, the other rotor assembly components can have designs that are easier to manufacture, thus reducing production complexity and cost.

Various embodiments of the present assemblies, devices, and systems have been described herein. It should be recognized, however, that these embodiments are merely illustrative of the principles of the present assemblies, devices, and systems. Numerous modifications and adaptations thereof will be apparent to those skilled in the art without departing from the spirit and scope of the present assemblies, devices, and systems.

The various embodiments described above can be combined to provide further embodiments. All of the above U.S. patents, patent applications and publications referred to in this specification as well as U.S. Provisional Patent Application No. 60/432,468, filed on Dec. 10, 2002; U.S. patent application Ser. No. 10/728,715, filed on Dec. 4, 2003; U.S. Provisional Patent Application No. 60/432,727, filed on Dec. 11, 2002; and U.S. patent application Ser. No. 10/730,759, filed on Dec. 8, 2003 are incorporated herein by reference, in their entirety. Aspects of the invention can be modified, if necessary, to employ devices, features, and concepts of the various patents, applications and publications to provide yet further embodiments of the invention.

The invention claimed is:

1. A rotor assembly, comprising:
   a rotor hub comprising an outer diameter and an inner diameter, a plurality of uniformly, circumferentially spaced magnet pockets located between the outer diameter and the inner diameter;
   a first set of permanent magnets, a respective one of the permanent magnets of the first set of permanent magnets received in a respective one of the magnet pockets;
   an intermediate hub comprising an outer diameter and an inner diameter, the intermediate hub further comprising a plurality of lightening holes axisymmetrically arranged between a region bordered by the outer diameter and the inner diameter of the intermediate hub, the outer diameter of the intermediate hub being sized to closely receive the inner diameter of the rotor hub; and
   a shaft comprising an outer diameter sized to closely receive the inner diameter of the intermediate hub.

2. The rotor assembly of claim 1, further comprising:
   a banding layer formed on the outer diameter of the rotor hub for providing a centrifugal restraint to the rotor hub.

3. The rotor assembly of claim 2 wherein the banding layer is made from a lay-up of carbon fibers with an epoxy matrix.

4. The rotor assembly of claim 1 wherein each of the permanent magnets of the first set of permanent magnets are attached to the rotor hub with an adhesive.

5. The rotor assembly of claim 4 wherein the adhesive is one of either an epoxy adhesive or a cyanoacrylate adhesive.

6. The rotor assembly of claim 1, further comprising:
   a first keyway formed on the outer diameter of the shaft;
   a second keyway complementarily formed on the inner diameter of the second portion of the rotor hub, the first and second keyways providing a torsional coupling between the shaft and the rotor hub.

7. The rotor assembly of claim 1 wherein the intermediate hub is interference fit with the shaft to provide a torsional coupling between the intermediate hub and the shaft.

8. The rotor assembly of claim 1 wherein the intermediate hub is made from aluminum.

9. An electric machine, comprising:
   a rotor assembly comprising a rotor hub, a shaft and an intermediate hub, the rotor hub comprising an outer diameter and an inner diameter, a plurality of uniformly, circumferentially spaced magnet pockets located between the outer diameter and the inner diameter;
   a first set of permanent magnets, a respective one of the permanent magnets of the first set of permanent magnets received in a respective one of the magnet pockets;
   an intermediate hub comprising an outer diameter and an inner diameter, the intermediate hub further comprising a plurality of lightening holes axisymmetrically arranged between a region bordered by the outer diameter and the inner diameter of the intermediate hub, the outer diameter of the intermediate hub being sized to closely receive the inner diameter of the rotor hub; and
   a stator comprising a plurality of windings, the windings positioned to electromagnetically cause rotation of the rotor assembly.

10. The electric machine of claim 9, further comprising:
    a banding layer formed on the outer diameter of the rotor hub for providing a centrifugal restraint to the rotor hub.

11. The electric machine of claim 10 wherein the banding layer is made from a lay-up of carbon fibers with an epoxy matrix.

12. The electric machine of claim 9 wherein the intermediate hub is interference fit with the shaft to provide a torsional coupling between the intermediate hub and the shaft.

13. A rotor hub comprising:
    an outer diameter and an inner diameter;
    a plurality of magnet pockets, the pockets formed in a region proximate to and slightly radially inward from the outer diameter of the rotor hub; and
    at least a first permanent magnet comprising a pole arc to pole pitch ratio of about 0.9 arranged within each magnet pocket.

14. The rotor hub of claim 13 wherein each magnet pocket extends axially through the rotor hub.

15. The rotor hub of claim 13, further comprising:
    a plurality of ribs formed between the magnet pockets.

16. The rotor hub of claim 13 wherein an arc of at least the first permanent magnet is about 40.5 degrees as measured with respect to an axis of rotation of the rotor hub.

17. The rotor hub of claim 13 wherein a thickness of at least the first permanent magnet is about 7.5 mm.

* * * * *